July 30, 1946.  H. P. PHILLIPS  2,404,862

PISTON RING ASSEMBLY ELEMENT AND METHOD OF MAKING

Filed Feb. 2, 1945  2 Sheets-Sheet 1

INVENTOR.
HAROLD P. PHILLIPS
BY Earl D. Chappell
ATTORNEYS.

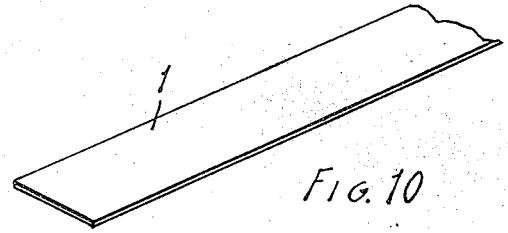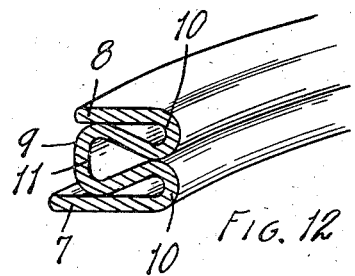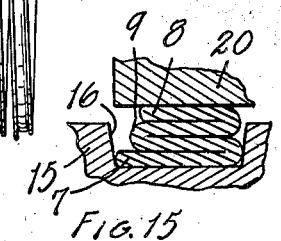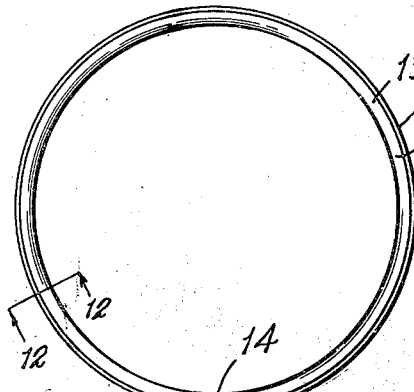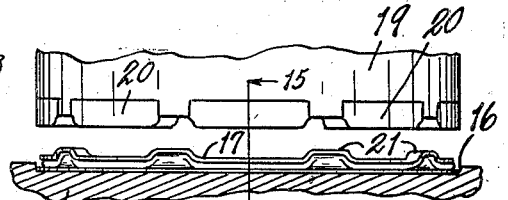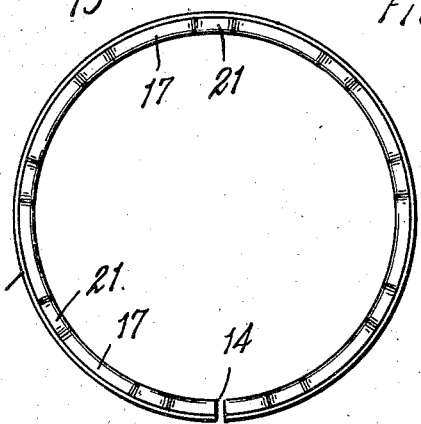

Patented July 30, 1946

2,404,862

UNITED STATES PATENT OFFICE 2,404,862

PISTON RING ASSEMBLY ELEMENT AND METHOD OF MAKING

Harold P. Phillips, Hastings, Mich., assignor to Hastings Manufacturing Company, Hastings, Mich., a corporation of Michigan Application February 2, 1945, Serial No. 575,754

12 Claims. (Cl. 309—44)

This invention relates to improvements in piston ring assembly element and method of making.

The main objects of this invention are:

First, to provide a piston ring or piston ring assembly formed entirely of ductile metal which can be readily and economically fabricated and is not likely to be broken or distorted in use.

Second, to provide a piston ring or piston ring assembly having these advantages with the advantage of very free drainage thereby well adapting it for use as an oil ring.

Third, to provide a piston ring element formed entirely of ductile metal having side drain openings, the stock or metal being continuous from end to end of the ring thereby providing uniform characteristics of strength and resilience and expansibility throughout the length of the ring.

Fourth, to provide a piston ring element formed of ductile metal which may be used as a spacer element in combination with flat elements formed of ribbon steel.

Fifth, to provide a method of manufacturing piston ring elements whereby elements of uniform characteristics may be economically produced.

Objects relating to details and economies of the invention will appear from the description to follow. The invention is defined and pointed out in the claims.

A preferred embodiment of the invention is illustrated in the accompanying drawings, in which:

Fig. 10 is a perspective view of a strip or ribbon of steel or metal such as is used in the forming of the piston ring element.

Fig. 11 is a perspective view illustrating the second step or coiling step, the first step in the manufacture being namely that of folding the ribbon stock longitudinally upon itself as a straight strip, not being illustrated but it will be understood from Figs. 11 and 12.

Fig. 12 is an enlarged perspective view of the multi-folded coil radially sectioned on line 12—12 of Fig. 13.

Fig. 13 is a side elevation viewed from the top of Fig. 12.

Fig. 14 is a fragmentary view partially in section of a punch or die apparatus used in the upsetting of spaced reaches of the element shown in Fig. 13 and illustrating a further step in the manufacture, the removable die member being shown in retracted position after the upsetting step.

Fig. 15 is an enlarged fragmentary view in section on line 15—15 of Fig. 14.

Fig. 16 is a side view of the ring element as removed from the forming die and prior to permitting it to spring open to the normal expanded position shown in Fig. 2.

Figure 1:
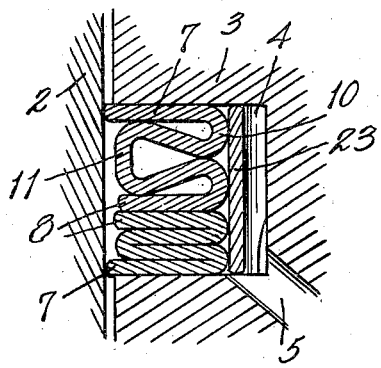
Fig. 1 is a fragmentary section of a piston ring embodying my invention, on line 1—1 of Fig. 3, installed in the drainage ring groove of a piston and in operative relation to a cylinder, the piston and cylinder parts being shown conventionally and without particular regard to dimensions or clearances.

In considering the accompanying drawings, it should be borne in mind that no attempt has been made to show the parts in their relative proportion or where associated with a piston and cylinder to show the clearances and relative dimensions.

The stock illustrated at 1 is relatively thin but it may vary considerably in thickness, depending somewhat on the size of the ring and the character of the material used and any range from .007 to .0030, for example, but desirably from .010 to .020. If the element is designed or intended merely as a spacer element for a pair of cylinder wall engaging side members, for example as shown in Figs. 6 to 9 inclusive, the spacer element may be of relatively soft material. However, it may desirably be made of wear-resisting materials even when used as a spacer, one side member of the element being used as a cylinder wall engaging or contacting member.

In the drawings, 2 represents a cylinder and 3 a piston having a piston ring groove 4 therein provided with drain passages 5. I will first describe one of the piston ring elements and the method of making as the description of the method will aid in an understanding of the description of the ring element.

The ring element designated generally by the numeral 6 is formed of a strip or ribbon of ductile metal which is folded longitudinally upon itself to form it into a general W-shape as shown for example in Fig. 12, thus providing side members 7 and 8 connected by a fold 9, the bights of the fold 10, 10 and 11 being open. These longitudinal folds can be effected in suitable folding rollers which are not illustrated as they form no part of this invention. The side member 7 is preferably substantially wider than the side member 8 and constitutes a cylinder wall engaging member as shown in Fig. 1.

After the strip 10 is folded longitudinally upon itself, it is coiled edgewise, the coils being shown in Fig. 11. These coils 12 are cut into annular sections 13, the ends of the section forming the ring spiral 14. In Fig. 13, the split of the annular element is substantially closed.

Figure 2:
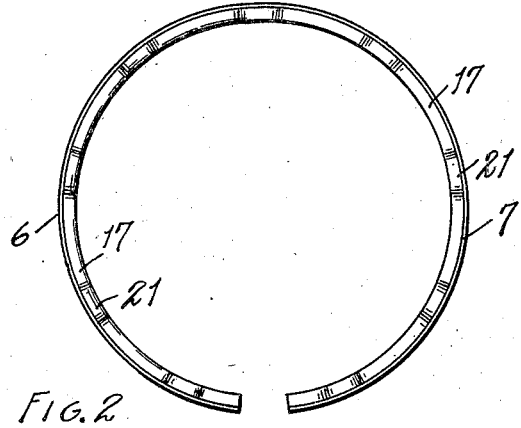
Fig. 2 is an inner side elevation of one of the piston ring elements in its expanded position.
Figure 3:
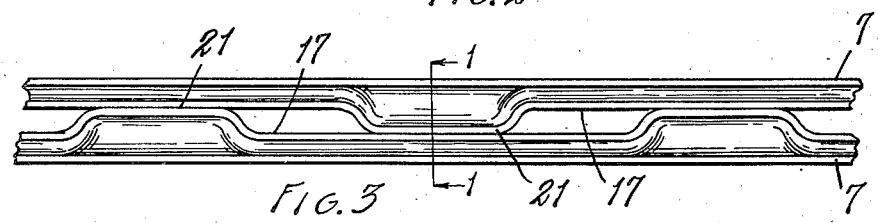
Fig. 3 is an enlarged fragmentary edge or peripheral view of the ring assembly of Fig. 1.
Figure 4:
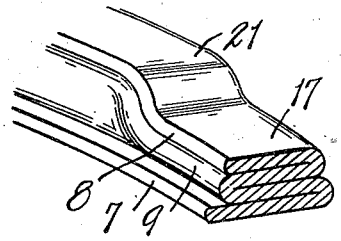
Fig. 4 is a fragmentary perspective view of a piston ring element sectioned through an axially upset reach thereof.
Figure 5:
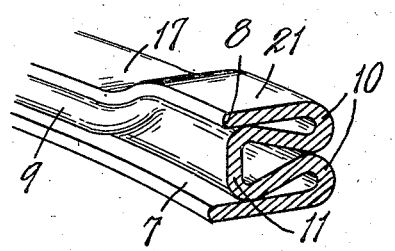
Fig. 5 is a perspective view of one of the piston ring elements sectioned through a spacer reach thereof.

It will be noted that the side member 7 is flat. The section 13 is laid upon an anvil member 15 having an annular recess 16 therein of such width as to receive the side member 7 and preferably support the ring in its collapsed position as shown in Fig. 13. Spaced reaches 17 of the members 8 and 9 are then upset axially by means of the die member 19 having an annular section of the radially arranged upsetting elements 20 which compress the members 8 and 9 into side by side contacting relation with the member 7. The reaches 21 between the upset reaches 17 constitute spacing members. When the elements are removed from the die, they normally spring to the open position shown in Fig. 2 and when they are inserted into a cylinder they are collapsed and they normally exert a substantial radial thrust or unit pressure as it is commonly designated against the cylinder wall. These elements are preferably formed of wear-resisting metal such as steel of proper carbon content although other wear-resisting metals and materials may be used. Steel is found highly satisfactory particularly where the element is designed as a cylinder wall engaging element as is shown in the embodiment of my invention illustrated in Fig. 1. In that embodiment, a pair of elements are arranged in opposed relation as shown in Fig. 3, the spaced members 21 being within the compressed reaches 17 which provide side drain recesses for the elements. In this arrangement, the reaches 17 are preferably substantially longer than the reaches 21 so that suitable drainage is provided.

Figures 6, 7:
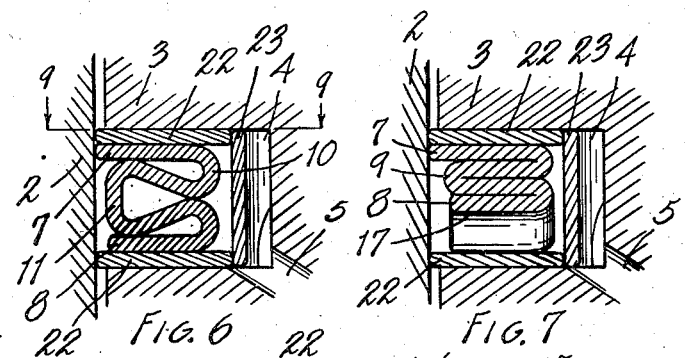
Fig. 6 is an enlarged fragmentary section on a line corresponding to line 6—6 of Figs. 8 and 9, illustrating a piston ring assembly comprising a pair of flat side members with one of the piston ring elements of this invention as an intermediate member.
Fig. 7 is a fragmentary view in section on a line corresponding to line 7—7 of Fig. 8.
Figure 9:
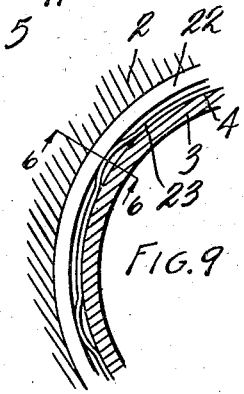
Fig. 9 is a transverse section on line 9—9 of Fig. 6.
Figure 8:
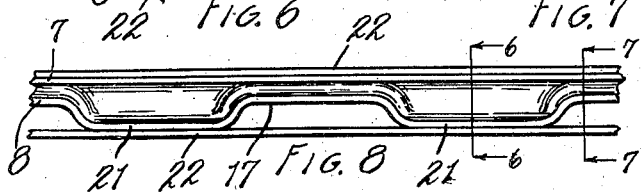
Fig. 8 is an edge or peripheral view of the ring assembly of Figs. 6, 7 and 9.

In the embodiment of my invention shown in Fig. 6, one of the elements is arranged intermediate the flat cylinder wall engaging members 22 and constitutes a supporting and spacer member therefor and also provides suitable drain openings or passages. In this embodiment, the expander 23 acts only on the side members 22. In the embodiment shown in Fig. 1, the expander 23 acts upon both of the elements.

It will be noted that no part of the ring element is cut away. The result is that the element has very uniform strength and tension from end to end. It is not subject to breakage or likely to be permanently distorted in manipulations to install the same. It may be made of quite thin stock consequently presenting a thin or relatively sharp edge to the cylinder wall and at the same time the cylinder wall engaging member is supported close to the edge thereof and is reinforced so that it does not distort or vibrate in use.

I have illustrated and described very practical embodiments of my invention. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent, is:

1. A piston ring assembly comprising a pair of thin split flat annular expansible cylinder wall engaging side elements formed of ductile wear-resisting material, and an annular split expansible intermediate element formed of ductile wear-resisting material folded longitudinally upon itself into a plurality of radially disposed outer and intermediate plies, the several plies being continuous from end to end of the element, one of the plies being flat and of greater axial width than the other plies and constituting a cylinder wall engaging member, the other plies being axially conformed to provide alternate drain reaches and spacer reaches.

2. A piston ring assembly comprising a pair of thin split flat annular expansible cylinder wall engaging side elements formed of ductile wear-resisting material, and an annular split expansible intermediate element formed of ductile wear-resisting material folded longitudinally upon itself into a plurality of radially disposed outer and intermediate plies, the several plies being continuous from end to end of the element, one of the plies being flat, the other plies being axially conformed to provide alternate side drain reaches and spacer reaches.

3. A piston ring element comprising a pair of annular split resilient piston ring elements, each formed of wear-resisting ductile metal folded upon itself into a plurality of plies disposed in side by side relation, one of the plies being flat and of greater radial width than the other plies and constituting a cylinder wall engaging element, the remaining plies being conformed to provide alternating spacer and side drain reaches, the drain reaches substantially exceeding in length the length of the spacer reaches, the elements being arranged with the spacer reaches of one element within the drain reaches of the other.

4. A piston ring assembly comprising a pair of annular split resilient piston ring elements, each formed of wear-resisting ductile metal folded upon itself into a plurality of plies disposed in side by side relation, one of the plies being flat and of greater radial width than the other plies and constituting a cylinder wall engaging element, the remaining plies being conformed to provide alternating spacer and side drain reaches, the elements being arranged with the spacer reaches of one element within the drain reaches of the other.

5. A split expansible inherently resilient piston ring element formed of a ribbon of ductile wear-resisting metal folded longitudinally upon itself to provide a flat cylinder wall engaging side member, a second side member of less radial width and an intermediate folded web portion of a width substantially that of the second member but folded to space the said side members, said side member and said intermediate web member being axially upset against the side of the cylinder wall engaging member at spaced reaches thereby providing side drain openings, the spaced portions and the upset portions being continuous.

6. A split expansible piston ring element formed of thin ductile wear-resisting material and comprising an annular flat cylinder wall engaging side member, and a second side member of less radial width, the inner edges of said side member being integrally connected by a folded intermediate member, said second side member and said intermediate member having spaced reaches thereof axially spaced relative to each other and reaches intermediate such spaced reaches in which the members are axially collapsed to provide side drainage recesses.

7. A split annular resilient piston ring element formed of ribbon steel folded longitudinally into a plurality of plies, one of the plies being flat and constituting a cylindrical wall engaging member, spaced reaches of the other plies being upset axially into side by side contacting relation with each other and with the cylinder wall engaging member, the reaches intermediate said upset reaches being of an axial width substantially exceeding the upset reaches and providing therewith alternate spacer reaches and drain reaches.

8. A split expansible piston ring element consisting of a ribbon of ductile metal folded longitudinally upon itself and coiled edgewise providing a cylinder wall engaging member constituted by one edge of the ribbon, and a multiple fold side portion at one side thereof, said multiple fold side portion being axially upset at spaced intervals to provide side drain recesses, the plies of the multi-fold side portion between said upset portions being axially spaced.

9. A split expansible resilient piston ring element formed of a ribbon of ductile wear-resisting metal folded longitudinally upon itself into a plurality of plies disposed side by side and coiled edgewise after folding, one of the plies being flat throughout and constituting a cylinder wall engaging member, the other plies being upset axially at spaced intervals against the inner side of the cylinder wall engaging ply providing spaced side drain openings.

10. A split expansible piston ring element formed of a ribbon of ductile wear-resisting metal folded longitudinally upon itself and coiled edgewise to provide a flat cylinder wall engaging side member and a second side member connected integrally thereto by an intermediate return fold, spaced reaches of said second side member and of said intermediate return fold being upset axially providing alternating spacer reaches and drain reaches.

11. A split expansible piston ring element formed of a strip of ductile metal folded longitudinally upon itself into a plurality of plies disposed side by side and coiled edgewise, the plies being continuous from end to end of the element, one of the plies being flat and constituting a cylinder wall engaging member, the other plies having spaced reaches axially upset providing alternating side drain recesses and spacer reaches.

12. A split expansible piston ring element formed of a strip of ductile metal folded longitudinally upon itself into a plurality of plies disposed side by side and coiled edgewise, the plies being continuous from end to end of the element, one of the plies being flat, the other plies having spaced reaches axially upset providing alternating side drain recesses and spacer reaches.

HAROLD P. PHILLIPS.